United States Patent
Kim et al.

(10) Patent No.: US 12,091,483 B2
(45) Date of Patent: Sep. 17, 2024

(54) METHOD OF PREPARING GRAFT POLYMER

(71) Applicant: LG CHEM, LTD., Seoul (KR)

(72) Inventors: Hyung Joon Kim, Daejeon (KR); Geon Soo Kim, Daejeon (KR); Moon Ja Hwang, Daejeon (KR); Hee Jung Jeon, Daejeon (KR); Chang Hoe Kim, Daejeon (KR); Min Su Chae, Daejeon (KR)

(73) Assignee: LG CHEM, LTD., Seoul (KR)

( * ) Notice: Subject to any disclaimer, the term of this patent is extended or adjusted under 35 U.S.C. 154(b) by 515 days.

(21) Appl. No.: 17/436,520

(22) PCT Filed: Sep. 7, 2020

(86) PCT No.: PCT/KR2020/012068
§ 371 (c)(1),
(2) Date: Sep. 3, 2021

(87) PCT Pub. No.: WO2021/060743
PCT Pub. Date: Apr. 1, 2021

(65) Prior Publication Data
US 2022/0177629 A1    Jun. 9, 2022

(30) Foreign Application Priority Data
Sep. 24, 2019   (KR) .................. 10-2019-0117615

(51) Int. Cl.
*C08F 279/04*    (2006.01)

(52) U.S. Cl.
CPC .................. *C08F 279/04* (2013.01)

(58) Field of Classification Search
CPC ........ C08F 279/04; C08K 5/092; C08K 5/098
See application file for complete search history.

(56) References Cited

U.S. PATENT DOCUMENTS

| | | | |
|---|---|---|---|
| 4,694,032 A * | 9/1987 | Kakimoto | C08L 51/04 524/217 |
| 2010/0048816 A1* | 2/2010 | Ryu | C08F 285/00 525/71 |
| 2020/0115540 A1 | 4/2020 | Park et al. | |
| 2020/0140597 A1 | 5/2020 | Jeon et al. | |

FOREIGN PATENT DOCUMENTS

| | | | |
|---|---|---|---|
| CN | 101654501 A | | 2/2010 |
| JP | 10859704 A | | 3/1996 |
| JP | H0859704 | * | 3/1996 |
| JP | H0971603 A | | 3/1997 |
| JP | 3181691 B2 | | 7/2001 |
| JP | 2003049041 A | | 2/2003 |
| KR | 10-0184705 B1 | | 5/1999 |
| KR | 10-2004-0052257 A | | 6/2004 |
| KR | 10-0623009 B | | 9/2006 |
| KR | 10-2006-0119255 A | | 11/2006 |
| KR | 10-1101092 B1 | | 12/2011 |
| KR | 10-2018-0047748 A | | 5/2018 |
| KR | 10-2018-0047749 A | | 5/2018 |
| KR | 10-2018-0047753 A | | 5/2018 |
| KR | 10-2019-0090338 A | | 8/2019 |
| KR | 10-2019-0096683 A | | 8/2019 |
| KR | 2019-0096683 | * | 8/2019 |
| KR | 10-2019-0102979 A | | 9/2019 |

OTHER PUBLICATIONS

Translation of JPH0859704 (Year: 1996).*
Translation of KR 2019-0096683 (Year: 2019).*
Supplementary European Search Report for related EP application No. 20868716.0, mailed Sep. 7, 2022.

* cited by examiner

*Primary Examiner* — Robert C Boyle

(57) ABSTRACT

Provided is a method of preparing a graft polymer, which includes: polymerizing a monomer mixture comprising a carboxylic acid monomer and methyl acrylate, wherein the carboxylic acid monomer is included at 1.5 to 2.5 wt %, and thus preparing an acrylic coagulant having an average particle diameter of 60 to 70 nm; polymerizing diene-based monomers in the presence of an emulsifier containing a salt of a compound and thus preparing a first diene-based rubber polymer; enlarging the first diene-based rubber polymer using the acrylic coagulant and thus preparing a second diene-based rubber polymer; and graft-polymerizing an aromatic vinyl-based monomer and a vinyl cyanide-based monomer to the second diene-based rubber polymer and thus preparing a graft polymer.

9 Claims, No Drawings

METHOD OF PREPARING GRAFT POLYMER

CROSS-REFERENCE TO RELATED APPLICATION

This application is a National Phase of International Application No. PCT/KR2020/012068 filed on Sep. 7, 2020, which claims priority to and the benefit of Korean Patent Application No. 10-2019-0117615, filed on Sep. 24, 2019, the disclosures of which are incorporated herein by reference in their entirety.

TECHNICAL FIELD

The present invention relates to a method of preparing a graft polymer, and more particularly, to a method of preparing a graft polymer having excellent impact strength, surface gloss, and appearance quality.

BACKGROUND ART

Diene-based graft polymers are prepared by graft-polymerizing aromatic vinyl-based monomers and vinyl cyanide-based monomers to diene-based rubber polymers. For the diene-based graft polymers, appearance characteristics such as color and gloss, as well as properties such as impact resistance, are emerging as important quality issues. However, when the diene-based graft copolymers are molded to prepare a molded article, gas may be generated due to the additives such as emulsifiers added in the preparation of diene-based rubber polymers, resulting in degradation of the appearance quality of the molded article.

Meanwhile, in order to prepare a diene-based graft copolymer having excellent impact resistance, the average particle diameter of a diene-based rubber polymer should be properly adjusted, and typically, when the average particle diameter is in the range of 250 nm to 400 nm, excellent impact resistance is realized without degradation of surface gloss characteristics. However, when a diene-based rubber polymer satisfying the average particle diameter is prepared through polymerization, production efficiency is low due to an excessively long polymerization time. Therefore, a method of preparing a diene-based rubber polymer having an average particle diameter of about 100 nm and then enlarging the diene-based rubber polymer using a coagulant was proposed. However, when an acrylic coagulant that is a copolymerization product of a carboxylic acid monomer and ethyl acrylate or of a carboxylic acid monomer and butyl acrylate was used for enlargement, there was a problem that the impact strength and surface gloss of a diene-based graft copolymer were lowered. In addition, since excessive amounts of expensive carboxylic acid monomers were used, there was a problem that preparing costs increased.

DISCLOSURE

Technical Problem

The present invention is directed to providing a method of preparing a graft polymer having excellent impact strength, surface gloss, and appearance quality.

Technical Solution

One aspect of the present invention provides a method of preparing a graft polymer, which comprises: polymerizing a monomer mixture including a carboxylic acid monomer and methyl acrylate, wherein the carboxylic acid monomer is included at 1.5 to 2.5 wt %, and thus preparing an acrylic coagulant having an average particle diameter of 60 to 70 nm; polymerizing diene-based monomers in the presence of an emulsifier containing a salt of a compound represented by Chemical Formula 1 and thus preparing a first diene-based rubber polymer; enlarging the first diene-based rubber polymer using the acrylic coagulant and thus preparing a second diene-based rubber polymer; and graft-polymerizing an aromatic vinyl-based monomer and a vinyl cyanide-based monomer to the second diene-based rubber polymer and thus preparing a graft polymer.

<Chemical Formula 1>

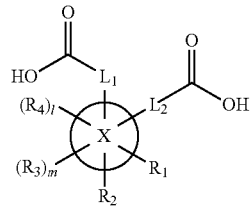

In Chemical Formula 1,
X is a $C_1$-$C_{20}$ tetravalent or higher aliphatic hydrocarbon,
$R_1$ to $R_4$, which are the same or different from each other, are each independently hydrogen, a $C_1$-$C_{20}$ monovalent aliphatic hydrocarbon, or -$L_3$-COOH,
$L_1$ to $L_3$, which are the same or different from each other, are each independently a direct bond or a $C_1$-$C_{20}$ divalent aliphatic hydrocarbon, and
l and m, which are the same or different from each other, are each independently 0 to 6.

Advantageous Effects

According to a method of preparing a graft polymer of the present invention, since the enlargement of a diene-based rubber polymer is carried out using an acrylic coagulant containing a small amount of carboxylic acid monomer units and having a small average particle diameter, a graft polymer having excellent impact strength and surface gloss can be prepared. In addition, since the amount of gas generated from an emulsifier added during the preparation of a graft polymer is greatly reduced, a molded article having improved appearance quality can be prepared.

MODES OF THE INVENTION

Hereinafter, the present invention will be described in more detail to facilitate understanding of the present invention.

Terms and words used in this specification and the claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

In the present invention, an average particle diameter can be measured using a dynamic light scattering method and more particularly using a Particle Sizing Systems Nicomp 380 instrument. In the present invention, the average particle diameter may refer to an arithmetic average particle diameter in the particle size distribution as measured by a dynamic light scattering method, that is, an average particle diameter in the scattering intensity distribution.

In the present invention, a carboxylic acid monomer may be one or more selected from the group consisting of acrylic acid, methacrylic acid, itaconic acid, crotonic acid, fumaric acid, and maleic acid and is preferably methacrylic acid. Units derived from the carboxylic acid monomer may be referred to as carboxylic acid monomer units.

In the present invention, a first diene-based rubber polymer is prepared of diene-based monomers, and the diene-based monomer may be one or more selected from the group consisting of 1,3-butadiene, isoprene, chloroprene, and piperylene and is preferably 1,3-butadiene.

In the present invention, an aromatic vinyl-based monomer may be one or more selected from styrene, α-methylstyrene, α-ethylstyrene, and p-methylstyrene and is preferably styrene. Units derived from the aromatic vinyl-based monomer may be referred to as aromatic vinyl-based monomer units.

In the present invention, a vinyl cyanide-based monomer may be one or more selected from the group consisting of acrylonitrile, methacrylonitrile, phenyl acrylonitrile, and α-chloroacrylonitrile, and is preferably acrylonitrile. Units derived from the vinyl cyanide-based monomer may be referred to as vinyl cyanide-based monomer units.

In the present invention, an alkyl group may be one or more selected from the group consisting of a methyl group, an ethyl group, a propyl group, an n-propyl group, an isopropyl group, a butyl group, an n-butyl group, an isobutyl group, a tert-butyl group, a sec-butyl group, a 1-methylbutyl group, a 1-ethylbutyl group, a pentyl group, an n-pentyl group, an isopentyl group, a neopentyl group, a tert-pentyl group, a hexyl group, an n-hexyl group, a 1-methylpentyl group, a 2-methylpentyl group, a 4-methyl-2-pentyl group, a 3,3-dimethylbutyl group, a 2-ethylbutyl group, a heptyl group, an n-heptyl group, a 1-methylhexyl group, a cyclopentyl methyl group, a cyclohexyl methyl group, an octyl group, an n-octyl group, a tert-octyl group, a 1-methylheptyl group, a 2-ethylhexyl group, a 2-propylpentyl group, an n-nonyl group, a 2,2-dimethylheptyl group, a 1-ethylpropyl group, a 1,1-dimethylpropyl group, an isohexyl group, a 2-methylpentyl group, a 4-methylhexyl group, a 5-methylhexyl group, and a 3-methyloctan-2-yl group.

In the present invention, an alkenyl group may be one or more selected from the group consisting of a vinyl group, a 1-propenyl group, an isopropenyl group, a 1-butenyl group, a 2-butenyl group, a 3-butenyl group, a 1-pentenyl group, a 2-pentenyl group, a 3-pentenyl group, a 3-methyl-1-butenyl group, a 1,3-butadienyl group, an allyl group, a 1-phenylvinyl-1-yl group, a 2-phenylvinyl-1-yl group, a 2,2-diphenylvinyl-1-yl group, a 2-phenyl-2-(naphthyl-1-yl)vinyl-1-yl group, a 2,2-bis(diphenyl-1-yl)vinyl-1-yl group, a stilbenyl group, a styrenyl group, (E)-non-1-en-1-yl, (E)-non-3-en-1-ylidene, (E)-oct-2-en-1-yl, and (E)-dec-1-en-1-yl.

In the present invention, an alkylene group may refer to the alkyl group with two binding sites, that is, a divalent alkyl group.

1. Method of Preparing Graft Polymer

A method of preparing a graft polymer according to one embodiment of the present invention includes: 1) polymerizing a monomer mixture including a carboxylic acid monomer and methyl acrylate, wherein the carboxylic acid monomer is included at 1.5 to 2.5 wt %, and thus preparing an acrylic coagulant having an average particle diameter of 60 to 70 nm; 2) polymerizing diene-based monomers in the presence of an emulsifier containing a salt of a compound represented by Chemical Formula 1 and thus preparing a first diene-based rubber polymer; 3) enlarging the first diene-based rubber polymer using the acrylic coagulant and thus preparing a second diene-based rubber polymer; and 4) graft-polymerizing an aromatic vinyl-based monomer and a vinyl cyanide-based monomer to the second diene-based rubber polymer and thus preparing a graft polymer.

<Chemical Formula 1>

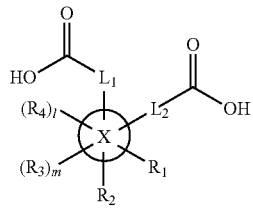

In Chemical Formula 1,

X is a $C_1$-$C_{20}$ tetravalent or higher aliphatic hydrocarbon, $R_1$ to $R_4$, which are the same or different from each other, are each independently hydrogen, a $C_1$-$C_{20}$ monovalent aliphatic hydrocarbon, or -$L_3$-COOH, $L_1$ to $L_3$, which are the same or different from each other, are each independently a direct bond or a $C_1$-$C_{20}$ divalent aliphatic hydrocarbon, and l and m, which are the same or different from each other, are each independently 0 to 6.

Hereinafter, each step of the method of preparing a graft polymer according to one embodiment of the present invention will be described in detail.

1) Preparation of Acrylic Coagulant

A monomer mixture including a carboxylic acid monomer and methyl acrylate, wherein the carboxylic acid monomer is included at 1.5 to 2.5 wt %, is polymerized, and thus an acrylic coagulant having an average particle diameter of 60 to 70 nm is prepared.

Since the monomer mixture includes a carboxylic acid monomer and methyl acrylate which work synergistically, the carboxylic acid monomer can be included at 1.5 to 2.5 wt %. When the monomer mixture includes ethyl acrylate or butyl acrylate rather than methyl acrylate while including the above-described amount of the carboxylic acid monomer, since the ability of an acrylic coagulant to induce enlargement is degraded, a first diene-based rubber polymer cannot be sufficiently enlarged, and thus a second diene-based rubber polymer having a desired average particle diameter cannot be prepared. As a result, the impact strength of a graft polymer, which is affected by the average particle diameter of the second diene-based rubber polymer, may be significantly lowered.

When the amount of the carboxylic acid monomer included in the monomer mixture is less than the above-described range, since a first diene-based rubber polymer cannot be sufficiently enlarged, a second diene-based rubber polymer having a desired average particle diameter cannot be prepared, and thus the impact strength of a graft polymer may be lowered. When the amount of the carboxylic acid monomer included in the monomer mixture exceeds the range, since an agglomeration phenomenon occurs during the preparation of a graft polymer, it may be difficult to prepare the graft polymer.

When the average particle diameter of the acrylic coagulant is less than the above-described range, the impact strength of a graft polymer may be lowered. When the average particle diameter of the acrylic coagulant exceeds the range, the surface gloss of a graft polymer may be lowered.

The acrylic coagulant may be prepared by a preparation method including: preparing a polymerization solution containing a monomer mixture, which includes the carboxylic acid monomer and the methyl acrylate monomer and in which the carboxylic acid monomer is included at 1.5 to 2.5 wt %, and a first emulsifier; and after adding a second emulsifier to a reactor, performing polymerization while continuously adding the polymerization solution.

The sum of the amounts of the first emulsifier and the second emulsifier may be 0.2 to 0.7 parts by weight or 0.3 to 0.6 parts by weight based on 100 parts by weight of the monomer mixture. When this range is satisfied, the average particle diameter of the acrylic coagulant can be easily adjusted to be in the range of 60 to 70 nm. In addition, when a first diene-based rubber polymer is enlarged, the first diene-based rubber polymer can be easily enlarged to have a desired average particle diameter, and at the same time, the generation of a coagulated mass can be minimized.

The weight ratio of the first emulsifier and the second emulsifier may be in the range of 50:50 to 70:30 and preferably 55:45 to 65:35. When this condition is satisfied, an acrylic coagulant having a desired average particle diameter can be prepared.

Meanwhile, each of the first emulsifier and the second emulsifier may be one or more selected from the group consisting of sodium dicyclohexyl sulfosuccinate, sodium dihexyl sulfosuccinate, sodium di-2-ethylhexyl sulfosuccinate, potassium di-2-ethylhexyl sulfosuccinate, sodium dioctyl sulfosuccinate, sodium dodecyl sulfate, sodium dodecyl benzene sulfate, sodium octadecyl sulfate, sodium oleic sulfate, potassium octadecyl sulfate, sodium dodecyl sulfonate, sodium dodecyl benzene sulfonate, potassium rosinate, and sodium rosinate and is preferably sodium dodecyl benzene sulfonate.

Meanwhile, the polymerization solution may additionally include an initiator and water.

The initiator may be one or more selected from the group consisting of sodium persulfate, potassium persulfate, ammonium persulfate, potassium perphosphate, hydrogen peroxide, t-butyl peroxide, cumene hydroperoxide, p-menthane hydroperoxide, di-t-butyl peroxide, t-butyl cumyl peroxide, acetyl peroxide, isobutyl peroxide, octanoyl peroxide, dibenzoyl peroxide, 3,5,5-trimethylhexanol peroxide, t-butyl peroxy isobutyrate, azobisisobutyronitrile, azobis-2,4-dimethylvaleronitrile, azobiscyclohexanecarbonitrile, and dimethyl azobisisobutyrate and is preferably potassium persulfate.

The initiator may be added in an amount of 0.02 to 2 parts by weight or 0.07 to 0.8 parts by weight based on 100 parts by weight of the monomer mixture and is preferably added in an amount of 0.07 to 0.8 parts by weight. When this range is satisfied, since a copolymerization product of the monomer mixture has an appropriate molecular weight, a diene-based rubber polymer can be easily enlarged.

The water may be ion-exchanged water.

Additional water may be added before adding the polymerization solution to the reactor.

2) Preparation of First Diene-Based Rubber Polymer

Diene-based monomers are polymerized in the presence of an emulsifier containing a salt of a compound represented by Chemical Formula 1, and thus a first diene-based rubber polymer is prepared:

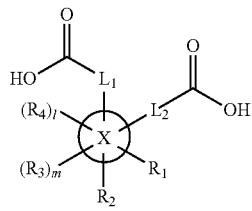

<Chemical Formula 1>

In Chemical Formula 1,

X is a $C_1$-$C_{20}$ tetravalent or higher aliphatic hydrocarbon, $R_1$ to $R_4$, which are the same or different from each other, are each independently hydrogen, a $C_1$-$C_{20}$ monovalent aliphatic hydrocarbon, or -$L_3$-COOH, $L_1$ to $L_3$, which are the same or different from each other, are each independently a direct bond or a $C_1$-$C_{20}$ divalent aliphatic hydrocarbon, and l and m, which are the same or different from each other, are each independently 0 to 6.

Since the emulsifier contains a salt of a compound represented by Chemical Formula 1, the emulsifier may have a higher vaporization temperature than conventional emulsifiers. Accordingly, when a thermoplastic resin composition including a graft polymer prepared using a diene-based rubber polymer of the present invention is molded, since the amount of gas generated from an emulsifier is significantly reduced, a molded article having excellent appearance quality can be manufactured. In addition, since a salt of a compound represented by Chemical Formula 1 contains two or more carboxylates, even with a small addition amount thereof, emulsion polymerization can be easily carried out.

In Chemical Formula 1, X may be a $C_1$-$C_{10}$ tetravalent or higher aliphatic hydrocarbon which is linear or cyclic.

In Chemical Formula 1, the total number of carbon atoms may be in the range of 30 to 50 or 35 to 45 and preferably 30 to 45. When this condition is satisfied, emulsion polymerization can be easily carried out even with a reduced amount of an emulsifier compared to conventional cases. In addition, since a salt of the compound represented by Chemical Formula 1 is not easily decomposed or gasified at high temperatures, when a thermoplastic resin composition including a graft polymer is molded, the amount of gas generated from an emulsifier is significantly reduced, and thus the appearance quality of a molded article can be significantly improved.

The emulsifier may contain a salt of one or more selected from the group consisting of compounds represented by Chemical Formula 2 to Chemical Formula 4:

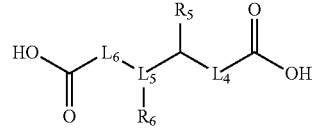

<Chemical Formula 2>

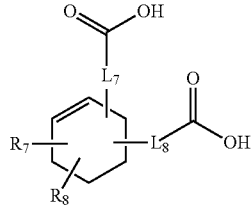

<Chemical Formula 3>

<Chemical Formula 4>

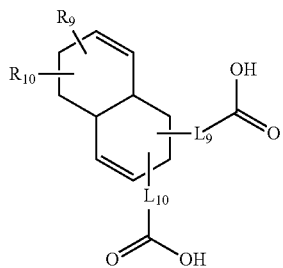

In Chemical Formula 2 to Chemical Formula 4, $L_4$ to $L_{10}$, which are the same or different from each other, are each independently a direct bond, a $C_1$-$C_{15}$ linear alkylene group, or a $C_2$-$C_{15}$ linear alkenylene group, provided that $L_5$ is not a direct bond, and $R_5$ to $R_{10}$, which are the same or different from each other, are each independently a $C_1$-$C_{15}$ linear alkyl group or a $C_2$-$C_{15}$ linear alkenyl group.

Here, the direct bond means that a bond was formed without $L_4$ and $L_6$ to $L_{10}$ being present.

The emulsifier may contain a salt of one or more selected from the group consisting of compounds represented by Chemical Formula 5 to Chemical Formula 10:

<Chemical Formula 5>

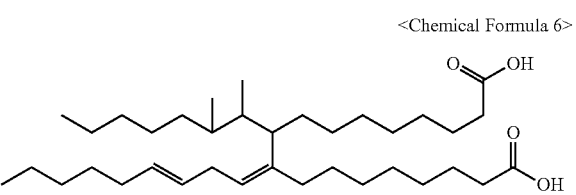

<Chemical Formula 6>

<Chemical Formula 7>

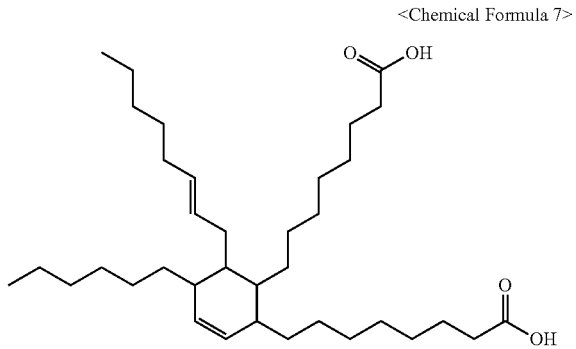

<Chemical Formula 8>

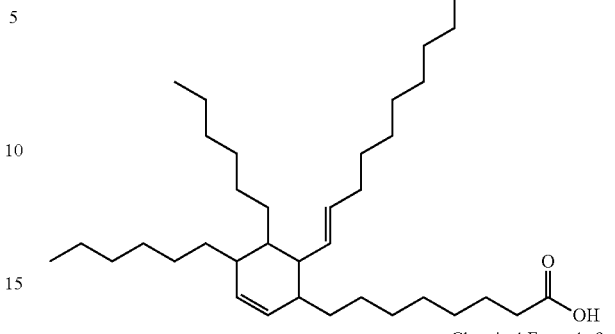

<Chemical Formula 9>

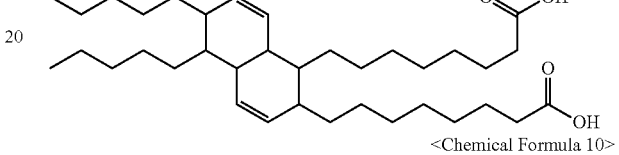

<Chemical Formula 10>

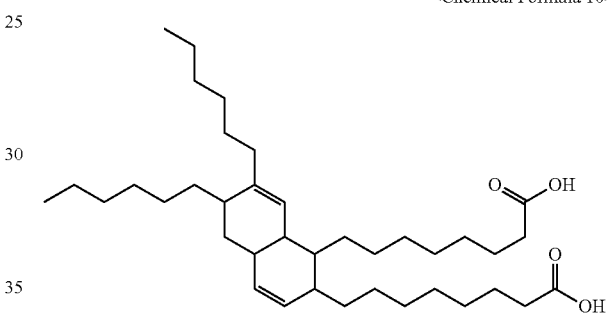

The compound represented by Chemical Formula 1 may be obtained through the multimerization of a linear unsaturated fatty acid. The compound represented by Chemical Formula 1 may be obtained in the form of a mixture of two or more compounds including an unsaturated fatty acid monomer, a derivative of the compound represented by Chemical Formula 1, and the like.

The linear unsaturated fatty acid may be one or more selected from the group consisting of 3-octenoic acid, 10-undecenoic acid, linoleic acid, elaidic acid, palmitoleic acid, stearic acid, tall oil fatty acids, soybean oil fatty acids, palm oil fatty acids, beef fatty acids, pork fatty acids, duck fatty acids, rice bran oil fatty acids, and linseed oil fatty acids.

A salt of a compound represented by Chemical Formula 1 may be an alkali metal salt of the compound represented by Chemical Formula 1 and is preferably a sodium salt or potassium salt of the compound represented by Chemical Formula 1.

A salt of a compound represented by Chemical Formula 1 may be formed by adding an alkali metal to the compound represented by Chemical Formula 1 and thereby substituting hydrogen of a carboxylic acid with the alkali metal, specifically sodium or potassium. When the compound represented by Chemical Formula 1 is in the form of a mixture, a salt thereof may be produced by adding an alkali metal to the mixture and thereby substituting hydrogen of a carboxylic acid with the alkali metal, specifically sodium or potassium.

The emulsifier may not only contain a salt of a compound represented by Chemical Formula 1, but may also include one or more selected from the group consisting of a by-product produced in the preparation of the compound represented by Chemical Formula 1, an unreacted monomer, and an alkali metal salt thereof.

As the emulsifier, one or more selected from the group consisting of commercially available products FS200 (manufactured by LG Household & Health Care Ltd.) and FS300 (manufactured by LG Household & Health Care Ltd.) may be used, and it/they may be used in combination with one or more saponification products selected from the group consisting of oleic acid and stearic acid.

The emulsifier may be present in an amount of 0.5 to 1.5 parts by weight and preferably 0.7 to 1.2 parts by weight based on 100 parts by weight of the diene-based monomer. When this condition is satisfied, emulsion polymerization can be easily carried out, and at the same time, the amount of a residual emulsifier in a graft polymer can be minimized.

Meanwhile, the polymerization may be carried out in the presence of one or more selected from the group consisting of an initiator, an electrolyte, a molecular-weight regulator, and water.

The initiator may be one or more selected from the group consisting of potassium persulfate, sodium persulfate, ammonium persulfate, cumene hydroperoxide, diisopropyl benzene hydroperoxide, azobisisobutyronitrile, t-butyl hydroperoxide, p-menthane hydroperoxide, and benzoyl peroxide and is preferably one or more selected from the group consisting of potassium persulfate and t-butyl hydroperoxide.

The initiator may be added in an amount of 0.0001 to 0.1 parts by weight or 0.001 to 0.05 parts by weight based on 100 parts by weight of the diene-based monomer and is preferably added in an amount of 0.001 to 0.05 parts by weight. When this condition is satisfied, a polymerization rate and polymerization stability can be balanced.

The electrolyte may be one or more selected from the group consisting of KCl, NaCl, KOH, $KHCO_3$, $NaHCO_3$, $K_2CO_3$, $Na_2CO_3$, $KHSO_3$, $NaHSO_3$, $K_4P_2O_7$, $Na_4P_2O_7$, $K_3PO_4$, $Na_3PO_4$, $K_2HPO_4$, and $Na_2HPO_4$ and is preferably one or more selected from the group consisting of KOH and $K_2CO_3$.

The electrolyte may be added in an amount of 0.01 to 1 part by weight or 0.05 to 0.5 parts by weight based on 100 parts by weight of the diene-based monomer and is preferably added in an amount of 0.05 to 0.5 parts by weight. When this condition is satisfied, a diene-based rubber polymer having a desired average particle diameter can be prepared.

The molecular-weight regulator may be one or more selected from the group consisting of an α-methyl styrene dimer, t-dodecyl mercaptan, n-dodecyl mercaptan, octyl mercaptan, carbon tetrachloride, methylene chloride, methylene bromide, tetraethylthiuram disulfide, dipentamethylene thiuram disulfide, and diisopropyl xanthogen disulfide and is preferably t-dodecyl mercaptan.

The molecular-weight regulator may be added in an amount of 0.01 to 1 part by weight or 0.05 to 0.8 parts by weight based on 100 parts by weight of the conjugated diene-based monomer and is preferably added in an amount of 0.05 to 0.8 parts by weight. When this condition is satisfied, there is an advantage that impact resistance is improved.

The water may be ion-exchanged water.

Meanwhile, the average particle diameter of the first diene-based rubber polymer may be in the range of 90 to 150 nm and preferably 100 to 140 nm. When this condition is satisfied, since the polymerization time during the preparation of a first diene-based rubber polymer is not long, production efficiency can be improved. In addition, a second diene-based rubber polymer having a desired average particle diameter can be easily prepared through enlargement.

3) Preparation of Second Diene-Based Rubber Polymer

The first diene-based rubber polymer is enlarged using the acrylic coagulant, and thus a second diene-based rubber polymer is prepared.

The amount of the acrylic coagulant may be 1 to 3 parts by weight and preferably 1.5 to 2.5 parts by weight based on 100 parts by weight of the first diene-based rubber polymer. When this condition is satisfied, the first diene-based rubber polymer can be easily enlarged to have a desired average particle diameter. In addition, in the process of preparing a graft polymer to be described below, it is possible to prevent the graft polymer from agglomerating due to a residual acrylic coagulant.

The second diene-based rubber polymer may have an average particle diameter of 250 to 400 nm and preferably 280 to 380 nm. When this condition is satisfied, a graft polymer having excellent impact resistance and surface gloss can be prepared.

4) Preparation of Graft Polymer

Subsequently, an aromatic vinyl-based monomer and a vinyl cyanide-based monomer are graft-polymerized to the second diene-based rubber polymer, and thus a graft polymer is prepared.

The amount of the second diene-based rubber polymer participating in graft polymerization may be 50 to 70 parts by weight and preferably 55 to 65 parts by weight based on 100 parts by weight of the sum of the second diene-based rubber polymer, the aromatic vinyl-based monomer, and the vinyl cyanide-based monomer. When this condition is satisfied, a graft polymer having excellent impact strength and surface gloss can be prepared.

The amount of the aromatic vinyl-based monomer participating in polymerization may be 20 to 40 parts by weight and preferably 25 to 35 parts by weight based on 100 parts by weight of the sum of the second diene-based rubber polymer, the aromatic vinyl-based monomer, and the vinyl cyanide-based monomer. When this condition is satisfied, a graft polymer having excellent processability can be prepared.

The amount of the vinyl cyanide-based monomer participating in polymerization may be 3 to 20 parts by weight and preferably 5 to 15 parts by weight based on 100 parts by weight of the sum of the second diene-based rubber polymer, the aromatic vinyl-based monomer, and the vinyl cyanide-based monomer. When this condition is satisfied, a graft polymer having excellent chemical resistance can be prepared.

The polymerization may be carried out in the presence of one or more selected from the group consisting of an initiator, an oxidation-reduction catalyst, a molecular-weight regulator, and ion-exchanged water.

Types of the initiator have been described above, and among those listed, cumene hydroperoxide is preferred.

The initiator may be present in an amount of 0.01 to 1 part by weight and preferably 0.1 to 0.5 parts by weight based on 100 parts by weight of the sum of the second diene-based rubber polymer, the aromatic vinyl-based monomer, and the vinyl cyanide-based monomer. When this range is satisfied, the amount of a residual emulsifier in a graft polymer can be minimized, and at the same time, emulsion polymerization can be easily carried out.

The oxidation-reduction catalyst may be one or more selected from the group consisting of sodium formaldehyde sulfoxylate, disodium dihydrogen ethylenediaminetetraacetate, ferrous sulfate, dextrose, sodium pyrophosphate, anhydrous sodium pyrophosphate, and sodium sulfate and is preferably one or more selected from the group consisting of dextrose, sodium pyrophosphate, and ferrous sulfate.

The oxidation-reduction catalyst may be present in an amount of 0.01 to 1 part by weight and preferably 0.1 to 0.5 parts by weight based on 100 parts by weight of the second diene-based rubber polymer, the aromatic vinyl-based monomer, and the vinyl cyanide-based monomer. When this range is satisfied, a polymerization conversion rate can be further increased.

Types of the molecular-weight regulator have been described above.

The molecular-weight regulator may be present in an amount of 0.01 to 1.0 parts by weight and preferably 0.05 to 0.5 parts by weight based on 100 parts by weight of the sum of the second diene-based rubber polymer, the aromatic vinyl-based monomer, and the vinyl cyanide-based monomer. When this range is satisfied, the weight-average molecular weight of a shell can be appropriately adjusted.

When the polymerization of the graft copolymer is completed, coagulation, aging, washing, and drying processes may be additionally performed to obtain a graft copolymer in a powder form.

Hereinafter, exemplary embodiments will be presented to facilitate understanding of the present invention, but it is obvious to those skilled in the art that the exemplary embodiments are merely illustrative of the present invention, and various changes and modifications can be made within the technical scope of the present invention, and the changes and modifications are encompassed within the scope of the appended claims.

Examples and Comparative Examples

<Preparation of Acrylic Coagulant>

100 parts by weight of a monomer mixture, which includes methacrylic acid (MAA), methyl acrylate (MA), ethyl acrylate (EA), and butyl acrylate (BA) in the amounts as shown below in Tables, 0.4 parts by weight of an aqueous potassium persulfate solution (concentration: 3 wt %), 170 parts by weight of ion-exchanged water, and a first emulsifier in an amount as shown below in Tables were uniformly mixed, and thereby a polymerization solution was prepared.

170 parts by weight of ion-exchanged water and a second emulsifier in an amount as shown below in Tables were added to a nitrogen-substituted polymerization reactor, and the temperature inside the reactor was raised to 80° C. Polymerization was performed while continuously adding the polymerization solution to the reactor at a constant rate for five hours, and thereby an acrylic coagulant latex was obtained.

<Preparation of First Diene-Based Rubber Polymer>

90 parts by weight of ion-exchanged water, 10 parts by weight of 1,3 butadiene as a monomer, 0.35 parts by weight of $K_2CO_3$ as an electrolyte, 0.1 parts by weight of t-dodecyl mercaptan as a molecular-weight regulator, an aqueous potassium persulfate solution (concentration: 3 wt %) as an initiator, and a third emulsifier or fourth emulsifier in an amount as shown below in Tables were batch-added to a nitrogen-substituted polymerization reactor, and a reaction was initiated at a reaction temperature of 69° C.

The reaction temperature was raised to 78° C. at the same time as the reaction was initiated, and polymerization was performed for 10 hours while continuously adding 90 parts by weight of 1,3-butadiene at a constant rate until a polymerization conversion rate of 97% was reached.

Meanwhile, 0.1 parts by weight of t-dodecyl mercaptan was added as a molecular-weight regulator when a polymerization conversion rate of 30% was reached. When a polymerization conversion rate of 97% was reached, that is, at the time when the continuous addition of monomers was completed, a fifth emulsifier or sixth emulsifier was added in an amount as shown below in Tables and polymerization was terminated, and thereby a first diene-based rubber polymer latex was obtained.

<Preparation of Second Diene-Based Rubber Polymer>

2 parts by weight (based on solid content) of the acrylic coagulant was continuously added to 100 parts by weight (based on solid content) of the first diene-based rubber polymer latex for eight minutes and stirred for 30 minutes, and thereby a second diene-based rubber polymer latex was obtained through enlargement.

<Preparation of Graft Polymer>

60 parts by weight (based on solid content) of the second diene-based rubber polymer latex, 30 parts by weight of styrene, 10 parts by weight of acrylonitrile, 0.345 parts by weight of t-dodecyl mercaptan, 0.12 parts by weight of cumene hydroperoxide, 0.113 parts by weight of dextrose, 0.08 parts by weight of sodium pyrophosphate, 0.0016 parts by weight of ferrous sulfate, and 26.4 parts by weight of ion-exchanged water were batch-added to a polymerization reactor which was substituted with nitrogen and had an internal temperature of 50° C., and polymerization was performed for 50 minutes while raising the temperature to 70° C. at a constant rate. Subsequently, after additionally adding 0.06 parts by weight of t-butyl hydroperoxide, 0.04 parts by weight of dextrose, 0.003 parts by weight of sodium pyrophosphate, and 0.0015 parts by weight of ferrous sulfate, polymerization was performed for one hour and then terminated, and thereby a graft polymer latex was obtained.

After coagulating the graft polymer latex using $MgSO_4$, aging, washing, dehydration, and drying were performed, and thereby a graft polymer powder was obtained.

<Preparation of Thermoplastic Resin Composition>

A thermoplastic resin composition was prepared by mixing the graft polymer powder at 25 parts by weight and 92HR (styrene/acrylonitrile polymer) manufactured by LG Chem at 75 parts by weight.

Experimental Example 1

Properties of the acrylic coagulants of Examples and Comparative Examples were evaluated as follows, and the results are shown below in Tables.

① Average particle diameter (nm): The average particle diameter was measured by a dynamic light scattering method using a Particle Sizing Systems Nicomp 380 HPL instrument.

② Weight-average molecular weight (g/mol): After dissolving an acrylic coagulant latex in tetrahydrofuran to an adjusted concentration of 2 mg/mL, stirring for 12 hours, and filtering with a 45 nm polytetrafluoroethylene filter, the weight-average molecular weight was measured through GPC analysis.

③ Polymerization conversion rate (%): 1 g of an acrylic coagulant latex was dried for 20 minutes in a 135° C. oven and a solid content thereof was measured, and the polymerization conversion rate was determined by dividing the measured solid content by a theoretical solid content (target total solid content (TSC)).

Experimental Example 2

A property of the first diene-based rubber polymers of Examples and Comparative Examples was evaluated as follows, and the results are shown below in Tables.
④ Average particle diameter (nm): The average particle diameter was measured by a dynamic light scattering method using a Particle Sizing Systems Nicomp 380 HPL instrument.

Experimental Example 3

A property of the second diene-based rubber polymers of Examples and Comparative Examples was evaluated as follows, and the results are shown below in Tables.
⑤ Average particle diameter (nm): The average particle diameter was measured by a dynamic light scattering method using a Particle Sizing Systems Nicomp 380 HPL instrument.

Experimental Example 4

A property of the graft polymers of Examples and Comparative Examples was evaluated as follows, and the results are shown below in Tables.
⑥ Amount of coagulated mass (ppm): After filtering a graft polymer latex using a 100-mesh and inputting the resultant in a convection oven and maintaining at 80° C. for 720 minutes, the weight of the coagulated mass of the graft polymer latex that did not pass through the 100-mesh was calculated according to the following equation.

Amount of coagulated mass (ppm)=[(Weight of coagulated mass that did not pass through 100-mesh)/(Theoretical total weight of second diene-based rubber polymer, styrene, acrylonitrile, and additives introduced during preparation of graft polymer)]×1,000,000

Experimental Example 5

The thermoplastic resin compositions of Examples and Comparative Examples were extruded to prepare pellets. A property of the pellets was evaluated by the methods described below, and the results are shown below in Tables.
⑦ Flow index (g/10 min): The flow index was measured in accordance with ASTM D1238 under conditions of 220° C. and 10 kg.

Experimental Example 6

The thermoplastic resin compositions of Examples and Comparative Examples were extruded and injection-molded to prepare specimens. Properties of the specimens were evaluated by the methods described below, and the results are shown below in Tables.
⑧ Impact strength (kgf·cm/cm, ¼ inch): The impact strength was measured in accordance with ASTM D256.
⑨ Surface gloss: The surface gloss of an injection-molded specimen was measured in accordance with ASTM D523 at 45° using a gloss meter (VG-7000+ Cu-2 manufactured by Nippon Denshoku Industries Co., Ltd.).
⑩ Gel evaluation: The gel evaluation was performed, in real time, using an optical gel counter at the same time as pellets were extruded into a film in a film extruder, by determining the gel size and gel number per unit area. The evaluation criteria are as follows.

○: Gel size=100 μm or more; gel number=100 or less

Δ: Gel size=100 μm or more; gel number=more than 100 and less than or equal to 250 x: Gel size=100 μm or more; gel number=more than 250

TABLE 1

| Classification | | Comparative Example 1 | Example 1 | Example 2 | Example 3 | Comparative Example 2 |
|---|---|---|---|---|---|---|
| Acrylic coagulant | MAA (wt %) | 1 | 1.5 | 2 | 2.5 | 3 |
| | MA (wt %) | 99 | 98.5 | 98 | 97.5 | 97 |
| | First emulsifier (parts by weight) | 0.3 | 0.3 | 0.28 | 0.26 | 0.26 |
| | Second emulsifier (parts by weight) | 0.2 | 0.2 | 0.2 | 0.2 | 0.2 |
| | ① Average particle diameter | 60 | 60 | 65 | 70 | 70 |
| | ② Polymerization conversion rate | 96.3 | 96.1 | 96.2 | 96.4 | 96 |
| | ③ Weight-average molecular weight | 240,000 | 250,000 | 260,000 | 250,000 | 260,000 |
| First diene-based rubber polymer | Third emulsifier (parts by weight) | 1 | 1 | 1 | 1 | 1 |
| | Fifth emulsifier (parts by weight) | 0.1 | 0.1 | 0.1 | 0.1 | 0.1 |
| | ④ Average particle diameter | 120 | 120 | 120 | 120 | 120 |
| Second diene-based rubber polymer | ⑤ Average particle diameter | 320 | 330 | 345 | 360 | 400 |
| Graft polymer | ⑥ Amount of coagulated mass | <0.01 | <0.01 | <0.01 | <0.01 | Agglomeration during graft |

TABLE 1-continued

| Classification | | Comparative Example 1 | Example 1 | Example 2 | Example 3 | Comparative Example 2 |
|---|---|---|---|---|---|---|
| Thermoplastic resin composition | ⑦ Flow index | 21.0 | 21.3 | 21.5 | 21.0 | polymer preparation |
| | ⑧ Impact strength | 27.5 | 30.0 | 31 | 31.5 | |
| | ⑨ Surface gloss | 96.2 | 96.5 | 96.0 | 95.8 | |
| | ⑩ Gel evaluation | ○ | ○ | ○ | Δ | |

MAA: Methacrylic acid
MA: Methyl acrylate
First emulsifier and second emulsifier: Sodium dodecyl benzene sulfonate
Third emulsifier and fifth emulsifier: Fatty acids, C18-unsatd., dimers, potassium salts (CAS No. 67701-19-3)

TABLE 2

| Classification | | Comparative Example 3 | Example 4 | Example 5 | Example 6 | Comparative Example 4 |
|---|---|---|---|---|---|---|
| Acrylic coagulant | MAA (wt %) | 2 | 2 | 2 | 2 | 2 |
| | MA (wt %) | 98 | 98 | 98 | 98 | 98 |
| | First emulsifier (parts by weight) | 0.32 | 0.30 | 0.28 | 0.26 | 0.24 |
| | Second emulsifier (parts by weight) | 0.2 | 0.2 | 0.2 | 0.2 | 0.2 |
| | ① Average particle diameter | 55 | 60 | 65 | 70 | 75 |
| | ② Polymerization conversion rate | 96.3 | 96.1 | 96.2 | 96.4 | 96.2 |
| | ③ Weight-average molecular weight | 240,000 | 250,000 | 260,000 | 250,000 | 260,000 |
| First diene-based rubber polymer | Third emulsifier (parts by weight) | 1 | 1 | 1 | 1 | 1 |
| | Fifth emulsifier (parts by weight) | 0.1 | 0.1 | 0.1 | 0.1 | 0.1 |
| | ④ Average particle diameter | 120 | 120 | 120 | 120 | 120 |
| Second diene-based rubber polymer | ⑤ Average particle diameter | 343 | 342 | 345 | 40 | 341 |
| Graft polymer | ⑥ Amount of coagulated mass | <0.01 | <0.01 | <0.01 | <0.01 | <0.01 |
| Thermoplastic resin composition | ⑦ Flow index | 21.1 | 21.4 | 21.5 | 21.2 | 21.0 |
| | ⑧ Impact strength | 27 | 30.8 | 31 | 30.6 | 28.5 |
| | ⑨ Surface gloss | 96.8 | 96.7 | 96.5 | 96.3 | 96.0 |
| | ⑩ Gel evaluation | | | | | |

MAA: Methacrylic acid
MA: Methyl acrylate
First emulsifier and second emulsifier: Sodium dodecyl benzene sulfonate
Third emulsifier and fifth emulsifier: Fatty acids, C18-unsatd., dimers, potassium salts (CAS No. 67701-19-3)

TABLE 3

| Classification | | Comparative Example 5 | Comparative Example 6 | Comparative Example 7 | Comparative Example 8 |
|---|---|---|---|---|---|
| Acrylic coagulant | MAA (wt %) | 1.5 | 2 | 2.5 | 2 |
| | MA (wt %) | — | — | — | 98 |
| | EA (wt %) | 98.5 | 98 | 97.5 | — |
| | First emulsifier (parts by weight) | 0.3 | 0.28 | 0.26 | 0.28 |
| | Second emulsifier (parts by weight) | 0.2 | 0.2 | 0.2 | 0.2 |
| | ① Average particle diameter | 60 | 65 | 70 | 65 |
| | ② Polymerization conversion rate | 96.5 | 96.2 | 96.3 | 96.2 |
| | ③ Weight-average molecular weight | 220,000 | 210,000 | 230,000 | 260,000 |
| First diene-based rubber polymer | Third emulsifier (parts by weight) | 1 | 1 | 1 | — |
| | Fourth emulsifier (parts by weight) | — | — | — | 1 |
| | Fifth emulsifier (parts by weight) | 0.1 | 0.1 | 0.1 | — |

TABLE 3-continued

| Classification | | Comparative Example 5 | Comparative Example 6 | Comparative Example 7 | Comparative Example 8 |
|---|---|---|---|---|---|
| | Sixth emulsifier (parts by weight) | — | — | — | 0.1 |
| | ④ Average particle diameter | 120 | 120 | 120 | 120 |
| Second diene-based rubber polymer | ⑤ Average particle diameter | 200 | 220 | 230 | 340 |
| Graft polymer | ⑥ Amount of coagulated mass | < 0.01 | < 0.01 | < 0.01 | < 0.01 |
| Thermoplastic resin composition | ⑦ Flow index | 18.2 | 18.0 | 18.1 | 21.2 |
| | ⑧ Impact strength | 14.8 | 14.9 | 15.0 | 30.5 |
| | ⑨ Surface gloss | 97.7 | 97.8 | 98.0 | 93.0 |
| | ⑩ Gel evaluation | o | o | o | o |

MAA:? Methacrylic acid
MA: Methyl acrylate
First emulsifier and second emulsifier: Sodium dodecyl benzene sulfonate
Third emulsifier and fifth emulsifier: Fatty acids, C18-unsatd., dimers, potassium salts (CAS No. 67701-19-3)
Fourth emulsifier and sixth emulsifier: Potassium rosinate?

Referring to Tables, in the case of Examples 1 to 3 in which an acrylic coagulant prepared using a monomer mixture including methacrylic acid at 1.5 to 2.5 wt % was used, it can be seen that the latex stability of the graft polymers was excellent and the impact strength, surface gloss, and appearance characteristics of the thermoplastic resin compositions were excellent. On the other hand, in the case of Comparative Example 1 in which an acrylic coagulant prepared using a monomer mixture including methacrylic acid at 1.0 wt % was used, it can be seen that the impact strength of the thermoplastic resin composition was lowered. In addition, in the case of Comparative Example 2 in which an acrylic coagulant prepared using a monomer mixture including methacrylic acid at 3 wt % was used, since an agglomeration phenomenon occurred during the preparation of a graft polymer, the graft polymer could not be prepared. In addition, in the case of Examples 4 to 6 in which an acrylic coagulant having an average particle diameter of 60 to 70 nm was used, it can be seen that the latex stability of the graft polymers was excellent and impact strength, surface gloss, and appearance quality were excellent. On the other hand, in the case of Comparative Example 3 in which an acrylic coagulant having an average particle diameter of 55 nm was used and Comparative Example 4 in which an acrylic coagulant having an average particle diameter of 75 nm was used, it can be seen that the impact strength of the thermoplastic resin compositions was lowered. Meanwhile, in the case of Comparative Examples 5 to 7 in which an acrylic coagulant prepared using a monomer mixture including ethyl acrylate rather than methyl acrylate was used, since the ability of the acrylic coagulant to induce enlargement was degraded, a second diene-based rubber polymer having an appropriate average particle diameter could not be prepared. As a result, the impact strength of the graft polymer, which is affected by the average particle diameter of the second diene-based rubber polymer, was significantly lowered. In addition, in the case of Comparative Example 8 in which potassium rosinate was used as an emulsifier in the preparation of a first diene-based rubber polymer, the surface gloss of the thermoplastic resin composition was significantly lowered.

The invention claimed is:

1. A method of preparing a graft polymer, comprising:
polymerizing a monomer mixture comprising a carboxylic acid monomer and methyl acrylate, wherein the carboxylic acid monomer is included at 1.5 to 2.5 wt %, and thus preparing an acrylic coagulant having an average particle diameter of 60 to 70 nm;
polymerizing diene-based monomers in the presence of an emulsifier containing a salt of a compound represented by Chemical Formula 1 and thus preparing a first diene-based rubber polymer;
enlarging the first diene-based rubber polymer using the acrylic coagulant and thus preparing a second diene-based rubber polymer; and
graft-polymerizing an aromatic vinyl-based monomer and a vinyl cyanide-based monomer to the second diene-based rubber polymer and thus preparing a graft polymer, <Chemical Formula 1>

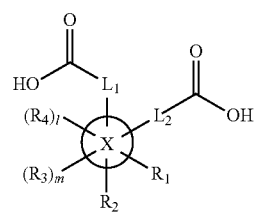

wherein, in Chemical Formula 1,
X is a $C_1$-$C_{20}$ tetravalent or higher aliphatic hydrocarbon,
$R_1$ to $R_4$, which are the same or different from each other, are each independently hydrogen, a $C_1$-$C_{20}$ monovalent aliphatic hydrocarbon, or -$L_3$-COOH,
$L_1$ to $L_3$, which are the same or different from each other, are each independently a direct bond or a $C_1$-$C_{20}$ divalent aliphatic hydrocarbon, and
l and m, which are the same or different from each other, are each independently 0 to 6.

2. The method of claim 1, wherein an amount of the acrylic coagulant is 1 part by weight to 3 parts by weight based on 100 parts by weight of the first diene-based rubber polymer.

3. The method of claim 1, wherein the emulsifier is present in an amount of 0.5 parts by weight to 1.5 parts by weight based on 100 parts by weight of the diene-based monomers.

4. The method of claim 1, wherein the emulsifier contains a salt of one or more selected from the group consisting of compounds represented by the following Chemical Formula 2 to Chemical Formula 4:

<Chemical Formula 2>

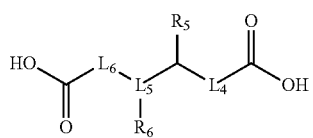

<Chemical Formula 3>

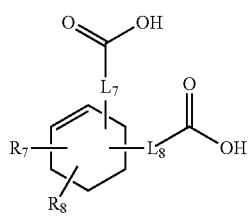

<Chemical Formula 4>

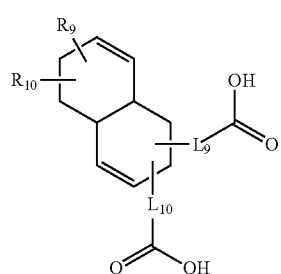

wherein, in Chemical Formula 2 to Chemical Formula 4, $L_4$ to $L_{10}$, which are the same or different from each other, are each independently a direct bond, a $C_1$-$C_{15}$ linear alkylene group, or a $C_2$-$C_{15}$ linear alkenylene group, provided that $L_5$ is not a direct bond, and $R_5$ to $R_{10}$, which are the same or different from each other, are each independently a $C_1$-$C_{15}$ linear alkyl group or a $C_2$-$C_{15}$ linear alkenyl group.

5. The method of claim 1, wherein the emulsifier contains a salt of one or more selected from the group consisting of compounds represented by the following Chemical Formula 5 to Chemical Formula 10:

<Chemical Formula 5>

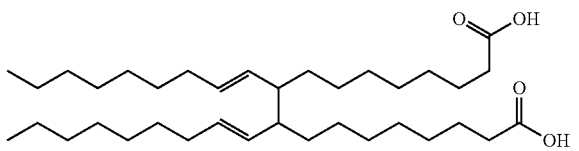

<Chemical Formula 6>

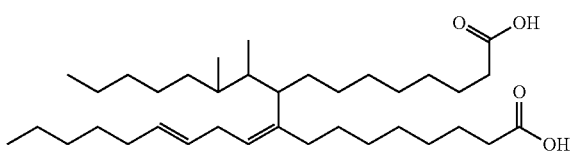

<Chemical Formula 7>

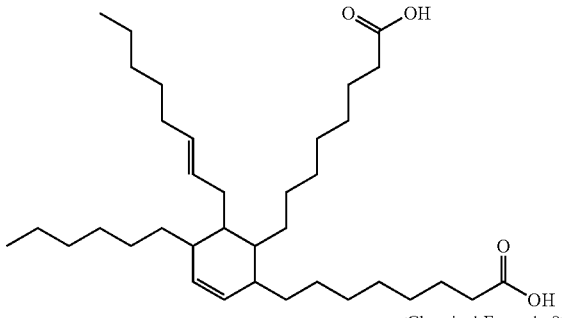

<Chemical Formula 8>

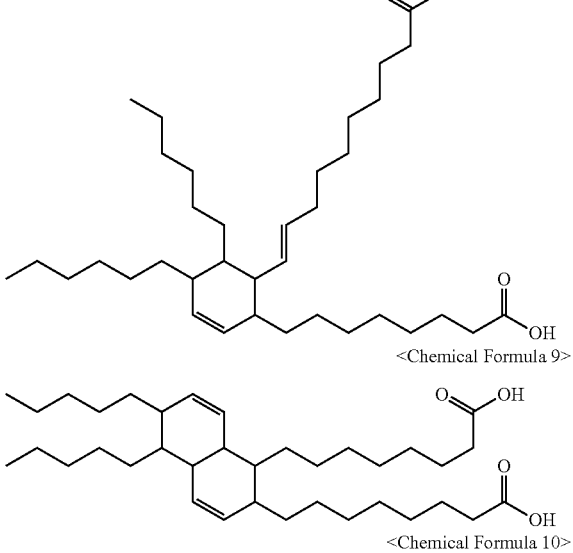

<Chemical Formula 9>

<Chemical Formula 10>

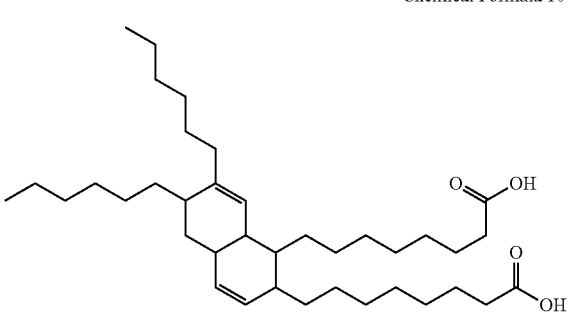

6. The method of claim 1, wherein the salt of the compound represented by Chemical Formula 1 is an alkali metal salt of the compound represented by Chemical Formula 1.

7. The method of claim 1, wherein the carboxylic acid monomer is one or more selected from the group consisting of acrylic acid, methacrylic acid, itaconic acid, crotonic acid, fumaric acid, and maleic acid.

8. The method of claim 1, wherein the first diene-based rubber polymer has an average particle diameter of 90 nm to 150 nm.

9. The method of claim 1, wherein the second diene-based rubber polymer has an average particle diameter of 250 nm to 400 nm.

* * * * *